US010652135B2

(12) United States Patent
Thubert et al.

(10) Patent No.: US 10,652,135 B2
(45) Date of Patent: May 12, 2020

(54) DISTRIBUTED CONSTRAINED TREE FORMATION FOR DETERMINISTIC MULTICAST

(71) Applicant: Cisco Technology, Inc., San Jose, CA (US)

(72) Inventors: Pascal Thubert, La Colle Sur Loup (FR); IJsbrand Wijnands, Leuven (BE); Patrick Wetterwald, Mouans Sartoux (FR); Eric Levy-Abegnoli, Valbonne (FR); Jean-Philippe Vasseur, Anchorage, AK (US)

(73) Assignee: Cisco Technology, Inc., San Jose, CA (US)

( * ) Notice: Subject to any disclaimer, the term of this patent is extended or adjusted under 35 U.S.C. 154(b) by 155 days.

(21) Appl. No.: 15/216,007

(22) Filed: Jul. 21, 2016

(65) Prior Publication Data

US 2018/0026870 A1 Jan. 25, 2018

(51) Int. Cl.
  *H04L 12/727* (2013.01)
  *H04L 12/753* (2013.01)
  *H04L 12/751* (2013.01)
  *H04L 12/721* (2013.01)
  *H04L 29/06* (2006.01)
  *H04L 12/725* (2013.01)

(52) U.S. Cl.
  CPC ............ *H04L 45/121* (2013.01); *H04L 45/02* (2013.01); *H04L 45/26* (2013.01); *H04L 45/32* (2013.01); *H04L 45/48* (2013.01); *H04L 65/4076* (2013.01); *H04L 45/302* (2013.01)

(58) Field of Classification Search
  None
  See application file for complete search history.

(56) References Cited

U.S. PATENT DOCUMENTS 8,599,683 B2 12/2013 Nakanishi et al.
9,185,024 B2 11/2015 Lin et al.
(Continued)

OTHER PUBLICATIONS

European Search Report dated Oct. 24, 2017 in connection with European Application No. 17 18 1349.
(Continued)

*Primary Examiner* — Chi H Pham
*Assistant Examiner* — Raul Rivas
(74) *Attorney, Agent, or Firm* — Behmke Innovation Group LLC; James M. Behmke; Jonathon P. Western (57) ABSTRACT

In one embodiment, a multicast listener device floods a path lookup request to search for a multicast tree, and may then receive path lookup responses from candidate nodes on the multicast tree, where each of the path lookup responses indicates a unicast routing cost from a respective candidate node to the multicast listener device, and where each of the candidate nodes is configured to suppress a path lookup response if a total path latency from a source of the multicast tree to the multicast listener device via that respective candidate node is greater than a maximum allowable path latency. The multicast listener device may then select a particular candidate node as a join point for the multicast tree based on the particular node having a lowest associated unicast routing cost to the multicast listener device from among the candidate nodes, and joins the multicast tree at the selected join point.

20 Claims, 9 Drawing Sheets (56) References Cited

U.S. PATENT DOCUMENTS

| | | |
|---|---|---|
| 9,232,026 B2 | 1/2016 | Olsen et al. |
| 2006/0187950 A1 | 8/2006 | Bou-Diab et al. |
| 2013/0148658 A1* | 6/2013 | Khanna ............... H04L 12/1886 370/390 |
| 2016/0043932 A1 | 2/2016 | Karthikeyan et al. |

OTHER PUBLICATIONS

Elizabeth M. Royer et al.: "Multicast operation of the ad-hoc on-demand distance vector routing protocol," Mobicom '99. Proceedings of the 5th Annual ACM/IEEE International Conference on Mobile Computing and Networking, Seattle, WA, Aug. 15-20, 1999; [Annual CM/IEEE International Conference on Mobile Computing and Networking], New York, NY: ACM, US, Aug. 15, 1999, pp. 207-218.

Chen et al.: "SoMR: A scalable distributed QoS multicast routing protocol," Journal of Parallel and Distributed Computing, Elsevier, Amsterdam, NL, vol. 68, No. 2, Nov. 12, 2007, pp. 137-149.

Charles E. Perkins, Nokia Researcfh Center, and Elizabth M. Belding, Royer University of California et al.: "Quality of Service for Ad hoc On-Demand Distance Vector Routing; draft-perkins-manet-aodvqos-01.txt", Internet Engineering Task Force, IETF; STANDARDWORKINGDRAFT, Internet Society (ISOC) 4, Rue des Falaises CH—1205 Geneva, Switzerland, No. 1, Oct. 14 , 2003, pp. 1-9.

Vida Lashakari B.O. et al.: "QoS-aware Multicast Ad hoc on-Demand Distance Vector Routing", Jul. 2, 2007, XP055416337, Retrieved from the Internet: URL:http://www.iaeng.org/publication/WCE2007/WCE2007_pp1506-1511.pdf.

* cited by examiner

DISTRIBUTED CONSTRAINED TREE FORMATION FOR DETERMINISTIC MULTICAST

TECHNICAL FIELD

The present disclosure relates generally to computer networks, and, more particularly, to distributed constrained tree formation for deterministic multicast.

BACKGROUND

Deterministic networking techniques have been emerging in the industry in order to transmit data (e.g., packets, frames, etc.) across a computer network in order to reach a desired recipient at (or near) a specific time. Example environments that benefit from deterministic network (such as deterministic Ethernet) include industrial engineering or other networks requiring precision control timing (e.g., controlling actuators at a precise time). Data networks, on the other hand, have conventionally been less deterministic, generally not requiring precise delivery timing.

Certain communication protocols may benefit from being more deterministic. For example, audio-video bridging (AVB) is an example of a time-sensitive networking environment, where synchronization, low-latency, and reliability are paramount to an effective AVB system. For instance, AVB requirements include synchronizing multiple streams to ensure they can be rendered correctly in time (e.g., for lip syncing), where a worst case delay, including source and destination buffering, must be low and deterministic (e.g., 2 ms-50 ms).

Notably, traditional AVB techniques (e.g., IEEE 1722 at 802.1) leverage multicast addresses but only enable unicast traffic, the multicast addresses being effectively an artifact. Furthermore, AVB techniques currently do not avoid congestion loss, but instead only minimize congestion by using/establishing links with greater bandwidth availability (aka, "fatter pipes"). Though increasing the bandwidth within a network can be effective, it can be considered inefficient and inelegant, over-utilizing network resources and requiring burdensome configuration changes within the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a multicast listener device in a network floods a path lookup request into the network to search for nodes on a multicast tree. The multicast listener device may then receive one or more path lookup responses from one or more candidate nodes on the multicast tree, where each of the one or more path lookup responses indicates a unicast routing cost from a respective candidate node to the multicast listener device, and where each of the one or more candidate nodes is configured to suppress a path lookup response if a total path latency from a source of the multicast tree to the multicast listener device via that respective candidate node is greater than a maximum allowable path latency. The multicast listener device may then select a particular node of the one or more candidate nodes as a join point for the multicast tree based on the particular node having a lowest associated unicast routing cost to the multicast listener device from among the one or more candidate nodes, and joins the multicast tree at the selected join point.

According to one or more additional embodiments of the disclosure, a node in a network receives a path lookup request flooded into the network from a multicast listener device to search for nodes on a multicast tree, and determines if the node is on the multicast tree. In response to determining that the node is on the multicast tree, the node may determine a total path latency from a source of the multicast tree to the multicast listener device via the node, such that in response to further determining that the total path latency is less than or equal to a maximum allowable path latency, the node may determine a unicast routing cost from the candidate node to the multicast listener device, and returns a path lookup response as a candidate node on the multicast tree, where the path lookup response indicates the unicast routing cost. As noted, the path lookup response may cause the multicast listener device to select a particular node of one or more candidate nodes as a join point for the multicast tree based on the associated unicast routing cost to the multicast listener device from among the one or more candidate nodes. Conversely, in response to determining that the total path latency is greater than the maximum allowable path latency, the node may suppress the path lookup response.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
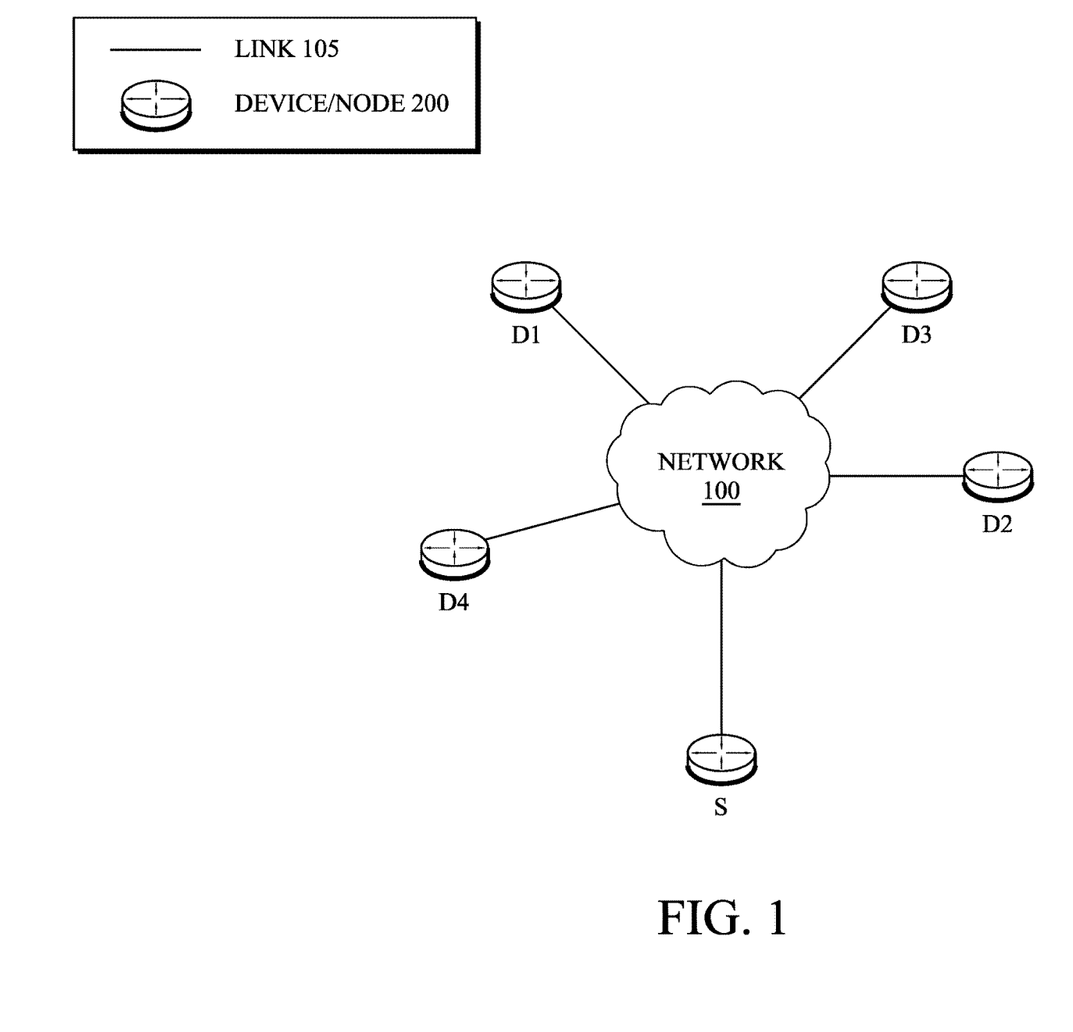
FIG. 1 illustrates an example communication network.

FIG. 1 is a schematic block diagram of an example simplified computer network 100 illustratively comprising nodes/devices 200 interconnected by links 105 according to various methods of communication. Those skilled in the art will understand that any number of nodes, devices, links, etc. may be used in the computer network, and that the view shown herein is for simplicity. As an example, network 100 may illustratively include a variety of devices 200, such as those shown and labeled as "D1-4" and "S", as described below, as well as any number of links 105 and devices 200 not specifically shown.

Figure 2:
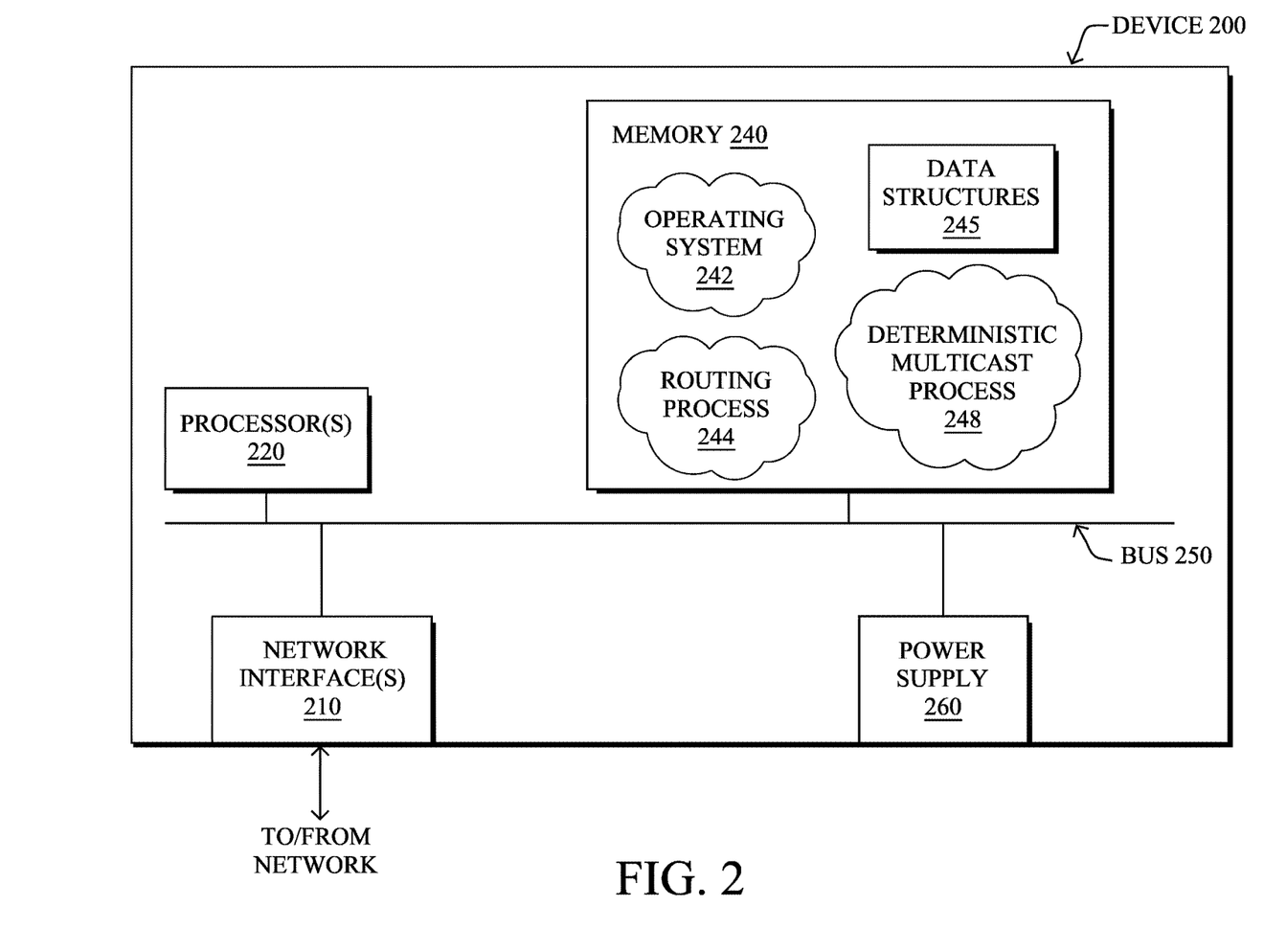
FIG. 2 illustrates an example network device/node.

FIG. 2 is a schematic block diagram of an example node/router 200 that may be advantageously used with one or more embodiments described herein, e.g., as multicast listener device, candidate device on a multicast tree, intermediate device not on a multicast tree, etc., as detailed below. The node comprises a plurality of network interfaces 210, one or more processors 220, and a memory 240 interconnected by a system bus 250. The network interfaces 210 contain the mechanical, electrical and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by each processor 220 and the network interfaces 210 for storing software programs and data structures associated with the present invention. The processor(s) 220 may comprise necessary elements or logic adapted to execute the software programs and manipulate the data structures, e.g., buffers/queues. A router operating system 242 (e.g., the Internetworking Operating System, or IOS™, of Cisco Systems, Inc.), portions of which are typically resident in memory 240 and executed by the processor(s), functionally organizes the node by, among other things, invoking network operations in support of software processes and/or services executing on the router. These software processes and/or services may comprise routing process 244 and an illustrative deterministic multicast process 248. It will be apparent to those skilled in the art that other processor and memory means, including various computer-readable media, may be used to store and execute program instructions pertaining to the inventive technique described herein. Note that while routing process 244 and deterministic multicast process 248 are shown in centralized memory 240, alternative embodiments provide for the processes to be specifically operated within the network interfaces 210.

Routing process 244 contains computer executable instructions executed by each processor 220 to perform functions provided by one or more routing protocols, such as the Interior Gateway Protocol (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing process 244 may also perform functions related to virtual routing protocols, such as maintaining VRF instances (not shown) as will be understood by those skilled in the art. In addition, routing process 244 may implement deterministic routing by scheduling the transmittal and/or delivery of packets within the network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Distributed Constrained Tree Formation for Deterministic Multicast—

As noted above, deterministic networking techniques transmit data across a computer network in order to reach a desired recipient at (or near) a specific time. Audio-video bridging (AVB) is an example of a time-sensitive networking environment, where synchronization, low-latency, and reliability are paramount to an effective AVB system. As also noted above, however, traditional AVB techniques leverage multicast addresses but only enable unicast traffic, the multicast addresses being effectively an artifact. Furthermore, AVB techniques currently do not avoid congestion loss, but instead only minimize congestion by using/establishing links with greater bandwidth availability.

The techniques herein help to reduce the network utilization involved in AVB multicasting, while lowering the chances of collisions within an existing deployment, which can be maintained longer before requiring reconfiguration (e.g., "fatter pipes"). In other words, the techniques herein enable deterministic multicast whereby the path from a source to each destination (listeners) would be computed within constraints (such as latency) and the network resources would be minimized. In particular, the techniques herein, as described below, leverage reactive routing technology to build a path towards an existing multicast tree so that a metric (e.g., latency from the source) is kept within constraints. In other words, the techniques herein provide a distributed way to build multicast trees that can serve AVB multicast (or other multicast purposes), and are topologically somewhere between a Steiner optimum and a shortest path first (SPF) tree as in the art of protocol independent multicast (PIM).

Notably, Steiner trees provide the optimal solution for consuming the least possible resources in a network linking all listeners to a source, thus minimizing the network resource usage and thus lowering the chances of congestion loss. However, computing a Steiner tree is NP complete and requires a centralized approach (recall that AVB technologies are generally distributed). Also, the optimal Steiner may not fit constraints such as the maximum distance (e.g., a latency) between the source and one destination. Finally when flows are added, installing the new Steiner optimum may disrupt traffic. The techniques herein, therefore, sacrifice optimality in exchange for enabling a smoother addition/deletion of listeners. (Note that approaching a Steiner optimum is desirable, but achieving it is a non-goal of the techniques herein.)

Specifically, according to one or more embodiments of the disclosure as described in detail below, a multicast listener device floods a path lookup request to search for a multicast tree, and may then receive path lookup responses from candidate nodes on the multicast tree, where each of the path lookup responses indicates a unicast routing cost from a respective candidate node to the multicast listener device, and where each of the candidate nodes is configured to suppress a path lookup response if a total path latency from a source of the multicast tree to the multicast listener device via that respective candidate node is greater than a maximum allowable path latency. The multicast listener device may then select a particular candidate node as a join point for the multicast tree based on the particular node having a lowest associated unicast routing cost to the multicast listener device from among the candidate nodes, and joins the multicast tree at the selected join point.

Illustratively, the techniques described herein may be performed by hardware, software, and/or firmware, such as in accordance with the deterministic multicast process 248, which may include computer executable instructions executed by the processor 220 (or independent processor of interfaces 210) to perform functions relating to the techniques described herein, e.g., in conjunction with routing process 244.

Figure 3:
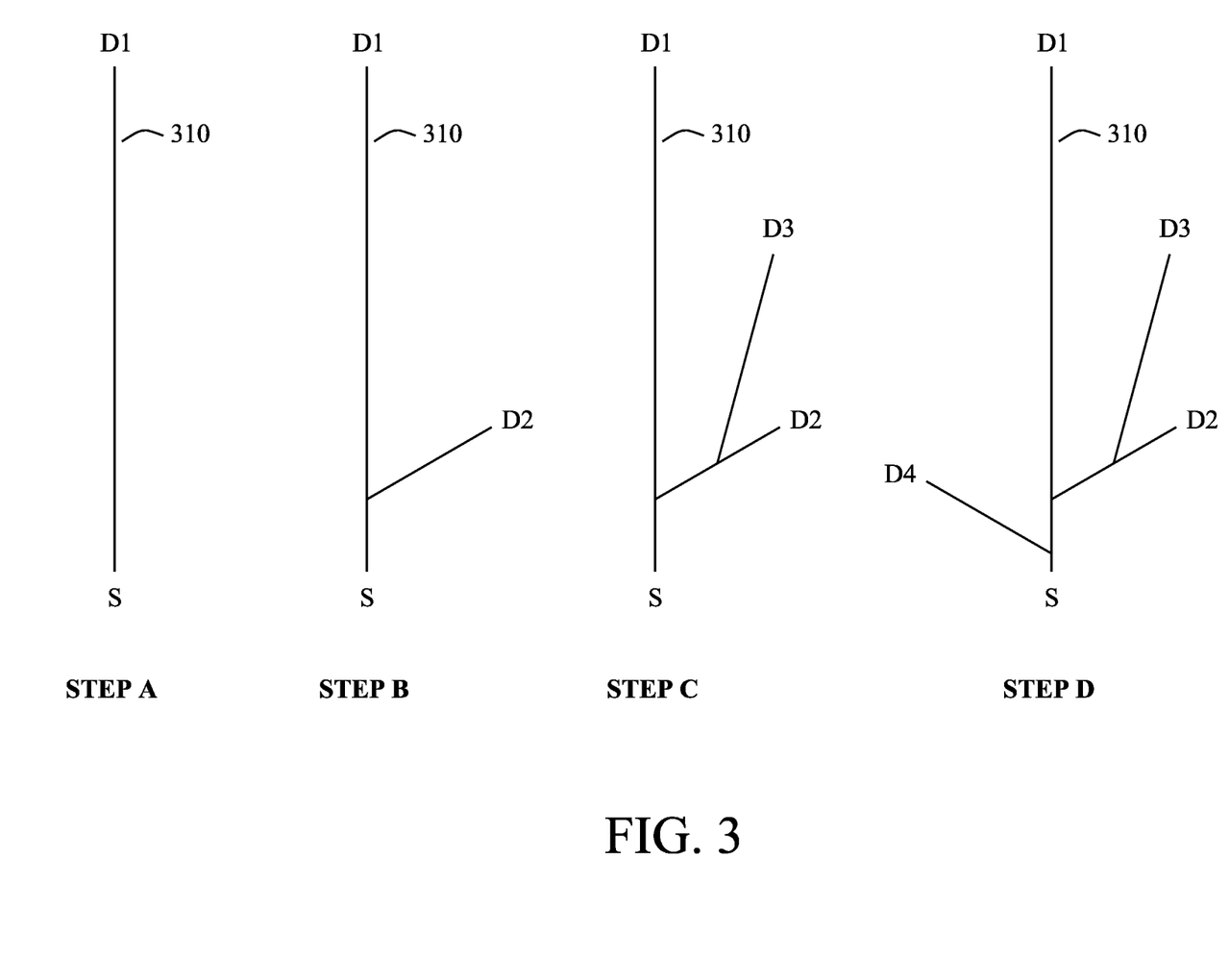
FIG. 3 illustrates an example multicast tree formation using shortest path first (SPF) techniques.

Operationally, and with reference to FIG. 3, traditional protocol independent multicast (PIM) builds shortest path trees for multicast, and this is done stepwise as shown as steps A, B, C, and D. In particular, as shown, a first multicast listener device "D1" establishes a multicast tree 310 with a multicast source device "S", as will generally be understood in the art. As each device D2-D4 subsequently joins the multicast tree 310 (steps B-D), a shortest path tree rooted at the source S is used to establish the connectivity, accordingly. PIM messages will follow the shortest path tree (SPF) rooted at the source (multicast tree 310). Notably, the total amount of network resource used for multicast in this instance is not optimal (i.e., far from the Steiner tree, as mentioned above).

With AVB (or other example generally deterministic technologies), the required property is that the packet reaches the final router/switch before some guaranteed time of delivery (TOD) to the end system. The time of delivery (TOD) is a precise limit, and the last AVB router/switch prior to the end system (listener devices D1-D4 in the example) must hold the packet from the time it gets it until the exact TOD.

While SPF-based multicast trees allow packets to reach the edge switch (D1-D4) as soon as possible, this is not always a desirable virtue, particularly for deterministic multicast. Specifically, this is because arrival ahead-of-time will cause the final router/switch to buffer packets for a longer time, which causes some buffer bloat and may eventually cause a congestion in that router/switch. Additionally, SPF trees tend to concentrate traffic on certain particular links, which become overcrowded with traffic.

According to the techniques herein, therefore, a distribution tree different from SPF is built, where such a tree uses less network resources. That is, the distribution/multicast tree according to the techniques herein is closer to a Steiner tree, yet without (necessarily) being a Steiner tree. In this manner, resources are not taken from the links along an SPF tree, so resources can be better utilized.

Figure 4:
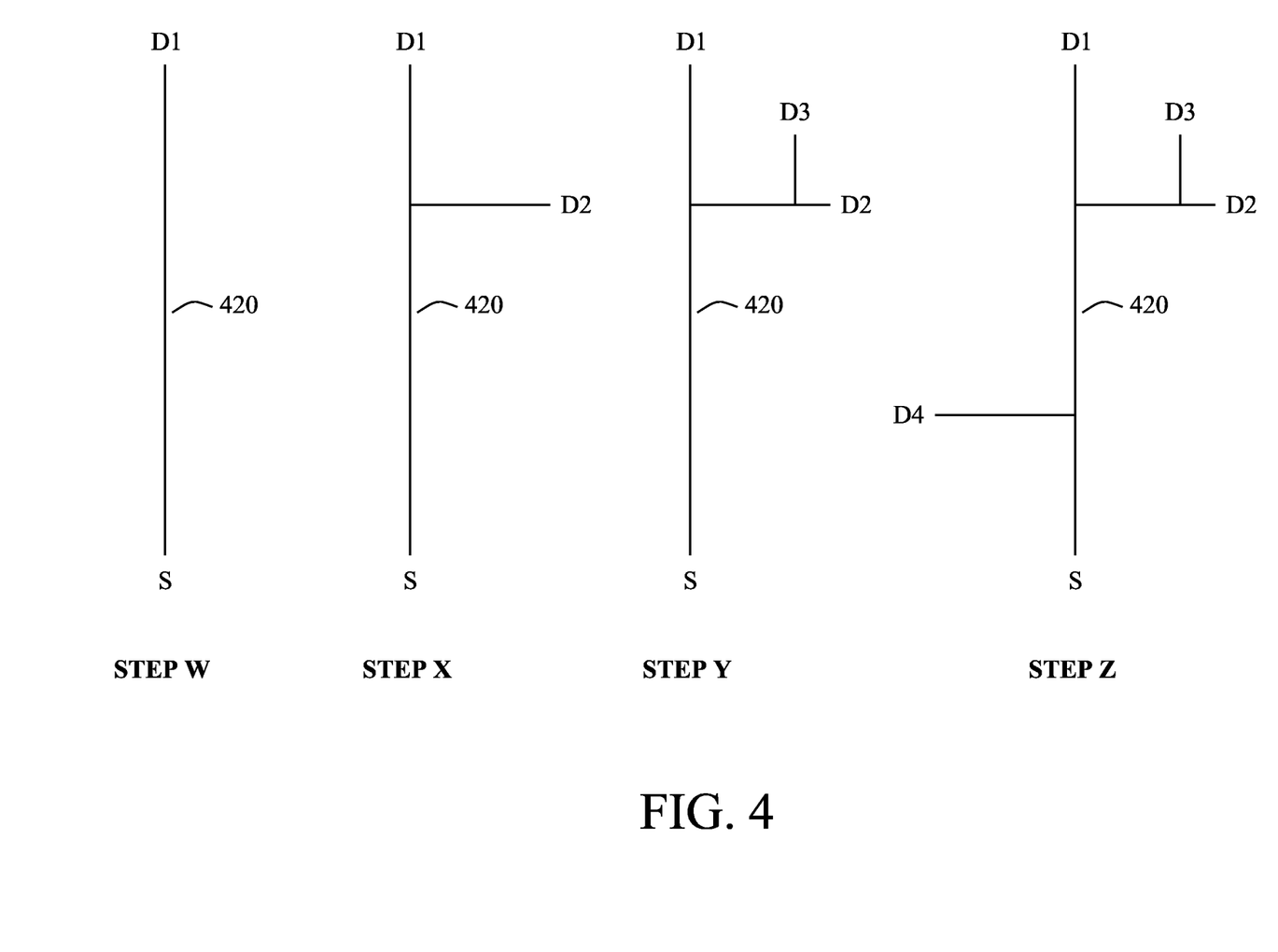
FIG. 4 illustrates an example multicast tree formation using distributed constrained tree formation for deterministic multicast.

For the same example as above (e.g., S sending to D1-D4), as shown now illustratively in FIG. 4, a distribution/multicast tree 420 may be built step-wise as shown in steps W-Z. In particular, the difference is that the PIM message used in conventional multicast tree creation is replaced by a reactive path lookup message (e.g., a variation of a reactive routing route request), as shown in detail below.

Figure 5:
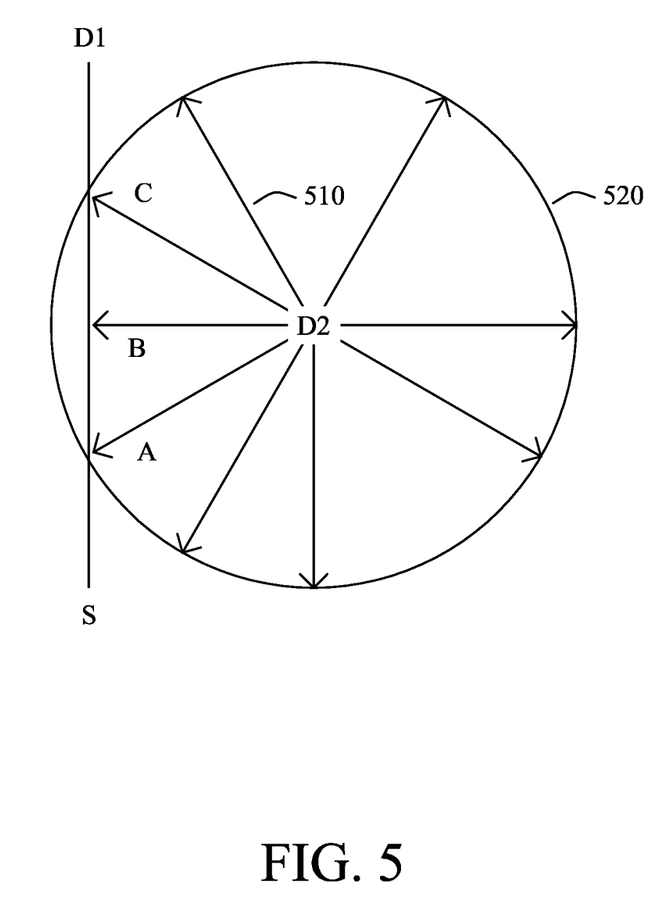
FIG. 5 illustrates an example flooding of a multicast path lookup request for distributed constrained tree formation for deterministic multicast.

With reference generally to FIG. 5, according to the techniques herein, a path lookup request 510 may be flooded from a new listener (e.g., D2) similarly to reactive routing, though according to the techniques herein, the lookup request 510 searches for any node that is already in the multicast tree 420. Note that along the way, the lookup request is also configured to aggregate the return path latency as well as the unicast routing cost to reach the multicast tree.

The path lookup may be bounded in the maximum range it can explore, typically a max unicast cost, such that only a "circle" (range 520) of a certain perimeter around the listener D2 is explored, where if no solution is found, a larger perimeter may be subsequently tried. According to the techniques herein, the flooding may also stop if a bounded latency is reached while aggregating the return path latency. This means, however, that there is no path that the source S can use to send data within latency (and other) constraints. Notably, in certain embodiments, the lookup request 510 may also carry additional constraints such as minimum available bandwidth so that it is not flooded over links that are already incapable to support the traffic for the new deterministic flow within the desired quality of service (QoS).

When the path lookup does reach the tree at a certain point, the nodes on the multicast tree 420 check if the latency from the source to that point, plus the aggregated return path latency from that point to the new listener, fits within the total acceptable latency. In the example shown in FIG. 5, there are three "hit" points, A, B, and C, for new listener D2. The other explorers 510 fail to hit the tree within perimeter 520.

Figure 6:
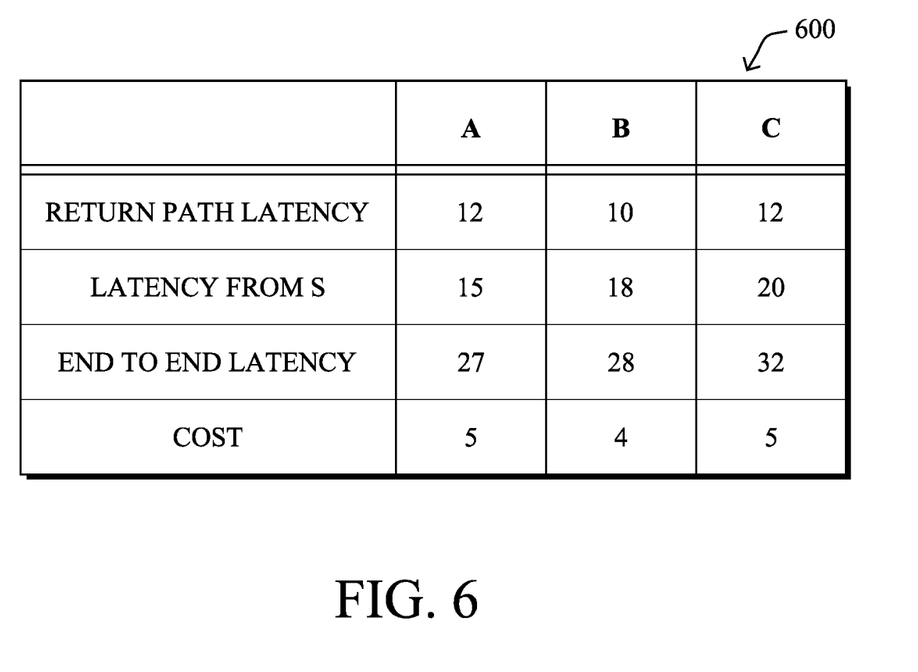
FIG. 6 illustrates an example chart of candidate and non-candidate nodes receiving the multicast path lookup request.

Assume in the example that nodes A and C are hit (reached) with an illustrative unicast cost of "5" (e.g., cost, hop count, etc.), and a return path latency of 12 ms. Node B is hit (reached) with an illustrative unicast cost of "4", and a return path latency of 10 ms. Assume further that the latency from S to reach A, B, and C is respectively 15, 18, and 20 ms. Chart 600 of FIG. 6 illustrates these results, accordingly.

Figure 7:
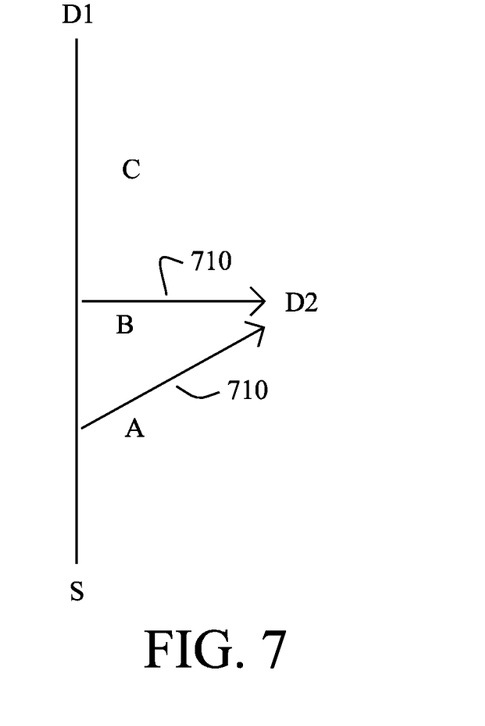
FIG. 7 illustrates an example of path responses from candidate nodes for distributed constrained tree formation for deterministic multicast.

According to the techniques herein, if the end-to-end path fits within the total acceptable latency, a unicast response is generated to the listener containing the hit point address and the unicast cost to get there. For example, assume that the acceptable latency is 30 ms. Going through node C does not fit within this latency, whereas nodes A and B are compliant. Accordingly, and as shown in FIG. 7, only candidate nodes A and B respond with a unicast response message 710 to D2.

The listener (D2) receives a certain number of responses and selects one that minimizes the unicast cost while staying within latency boundaries with margins. In the example above, D2 gets two responses: one from A with a cost of 5 and aggregated latency of 27 ms, and one from B with a cost of 4 and aggregated latency of 28 ms. Assuming that the margin is 2 ms (meaning, how close to the maximum of 30 ms the latency can be), both paths via candidate nodes A and B fit.

According to the techniques herein, although the best latency is via candidate node A, node B is preferred because the embodiments herein aim to minimize the amount of network resources, which maintains the tree closer to the Steiner optimum.

Figure 8:
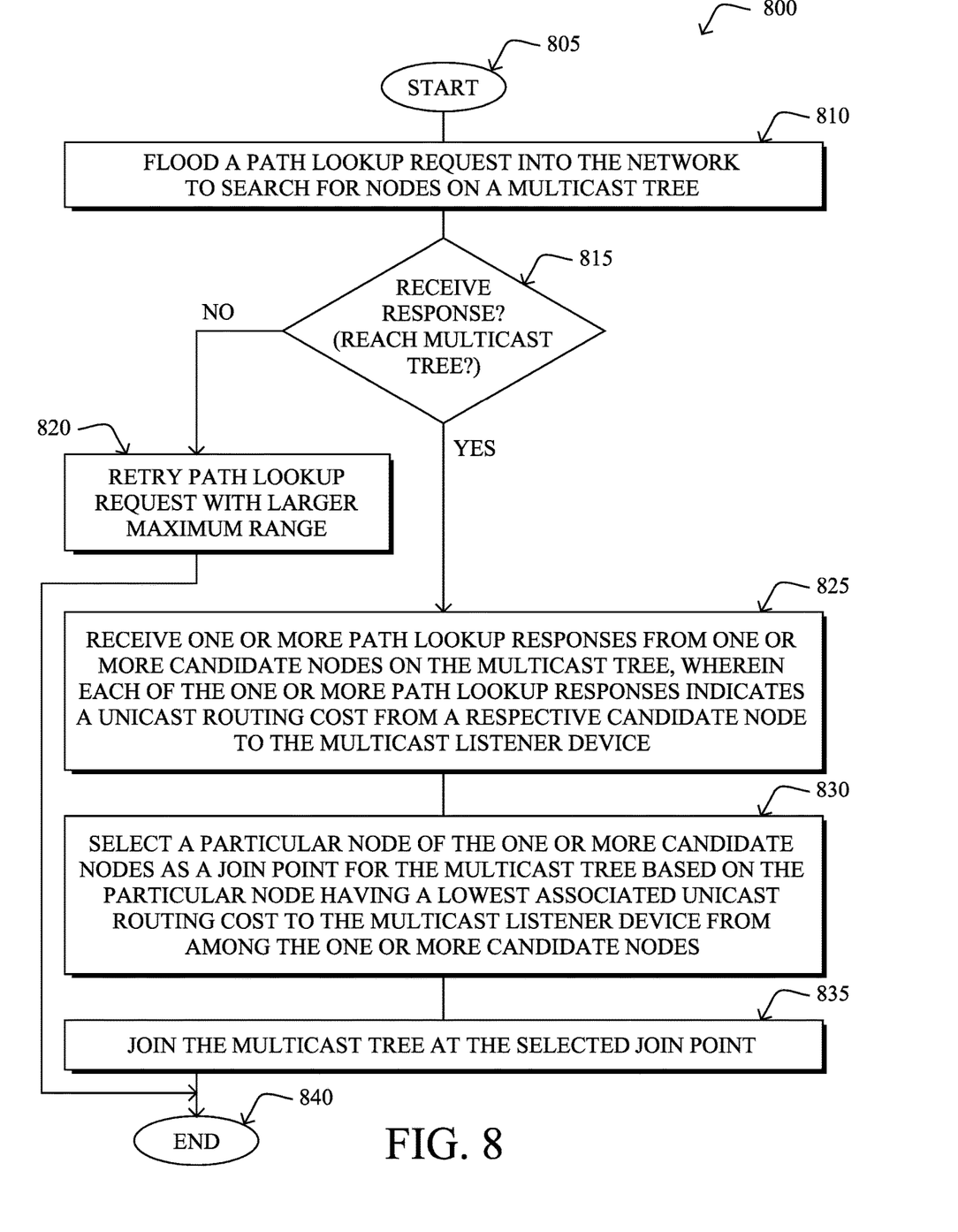
FIG. 8 illustrates an example simplified procedure for distributed constrained tree formation for deterministic multicast, particularly from the perspective of a new listening device.

FIG. 8 illustrates an example simplified procedure for distributed constrained tree formation for deterministic multicast in a network in accordance with one or more embodiments described herein, particularly from the perspective of a new listening device (e.g., D2). For example, a non-generic, specifically configured device (e.g., device 200) may perform procedure 800 by executing stored instructions (e.g., process 248). The procedure 800 may start at step 805, and continues to step 810, where, as described in greater detail above, a multicast listener device (e.g., D2) floods a path lookup request 510 into a network 100 to search for nodes on a multicast tree 420. As mentioned, the path lookup request may be configured to aggregate and carry return path latency and unicast routing cost along each flooding path while searching for nodes on the multicast tree. Note also that as further described above, the path lookup request may be associated with one or more constraints, where nodes within the network are configured to prevent flooding of the path lookup request on links that do not meet the one or more constraints (e.g., a minimum available link bandwidth).

Depending upon the network configuration, constraints, distances, connectivity, and so on, in step 815 the listener device may or may not receive a response (i.e., may or may not reach the multicast tree). For example, where the path lookup request is associated with a maximum range 520, nodes within the network may be correspondingly configured to prevent flooding of the path lookup request beyond the maximum range. Examples of a maximum range include, but are not limited to, a maximum allowable latency, a bounded latency before reaching the multicast tree, a maximum unicast routing cost before reaching the multicast tree, a maximum hop count before reaching the multicast tree, etc. If the tree 420 is not reached, then in step 820 the multicast listener device may retry the path lookup request 510 with a larger maximum range in the event of a failure to reach the multicast tree.

Upon receiving one or more path lookup responses 710 at the multicast listener device in step 825 from one or more candidate nodes on the multicast tree 420 (e.g., nodes A and B), the listener device (D2) can determine from each of the path lookup responses an indication of a unicast routing cost from a respective candidate node to the multicast listener device. As noted above, only A and B respond (and not C) because each of the candidate nodes is configured to suppress a path lookup response if a total path latency from a source of the multicast tree to the multicast listener device via that respective candidate node is greater than a maximum allowable path latency (e.g., the 30 ms example above).

Once all the responses are received (e.g., after waiting for a timeout period or until a first few responses are received), in step 830 the multicast listener device selects a particular node of the candidate nodes as a "join point" for the multicast tree 420 based on the particular node having a lowest associated unicast routing cost to the multicast listener device from among the one or more candidate nodes. As such, in step 835, the multicast listener device may join the multicast tree at the selected join point, and the illustrative procedure 800 ends in step 840.

Figure 9A:
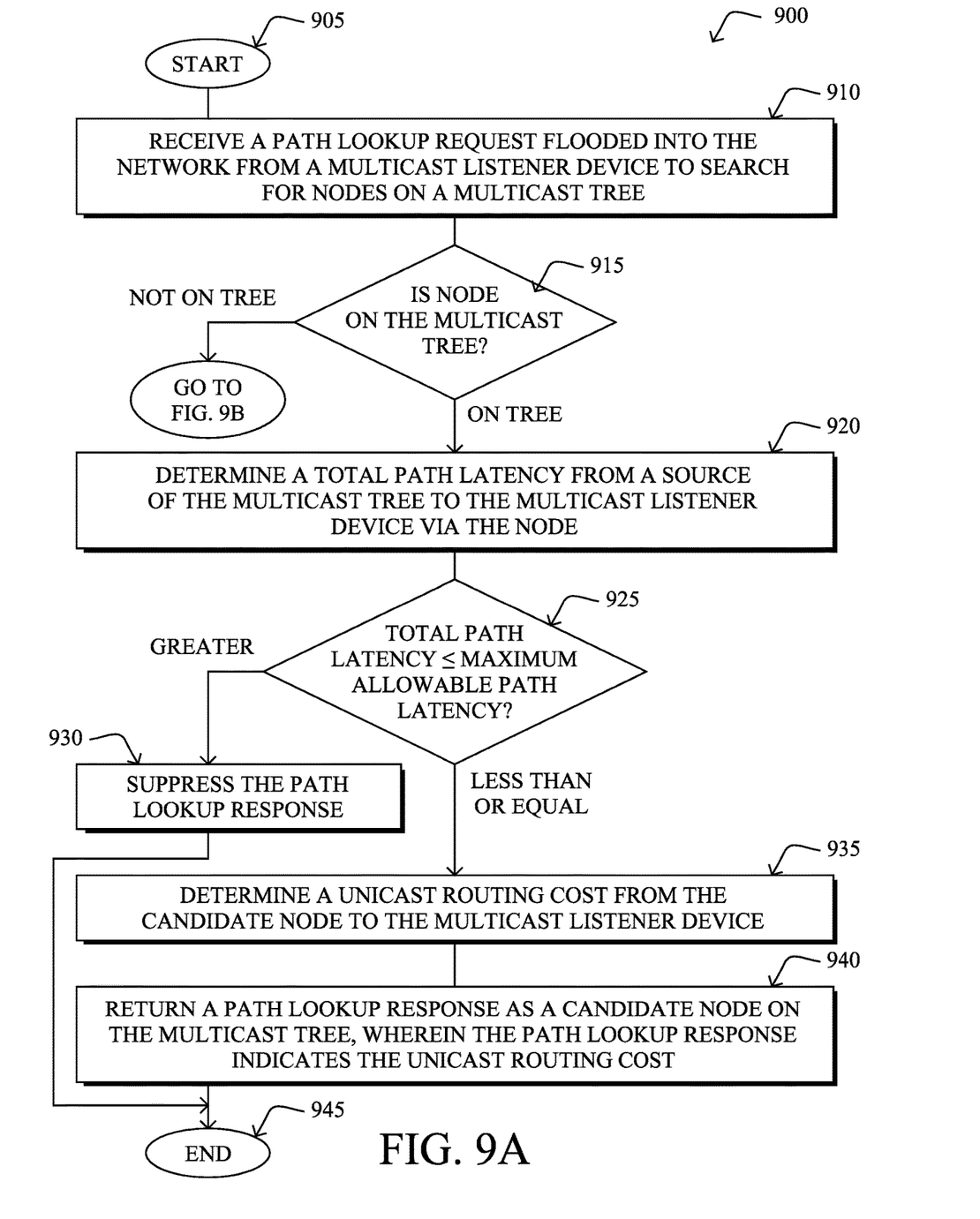
FIGS. 9A-9B illustrate another example simplified procedure for distributed constrained tree formation for deterministic multicast, particularly from the perspective of a device receiving a path lookup request.
Figure 9B:
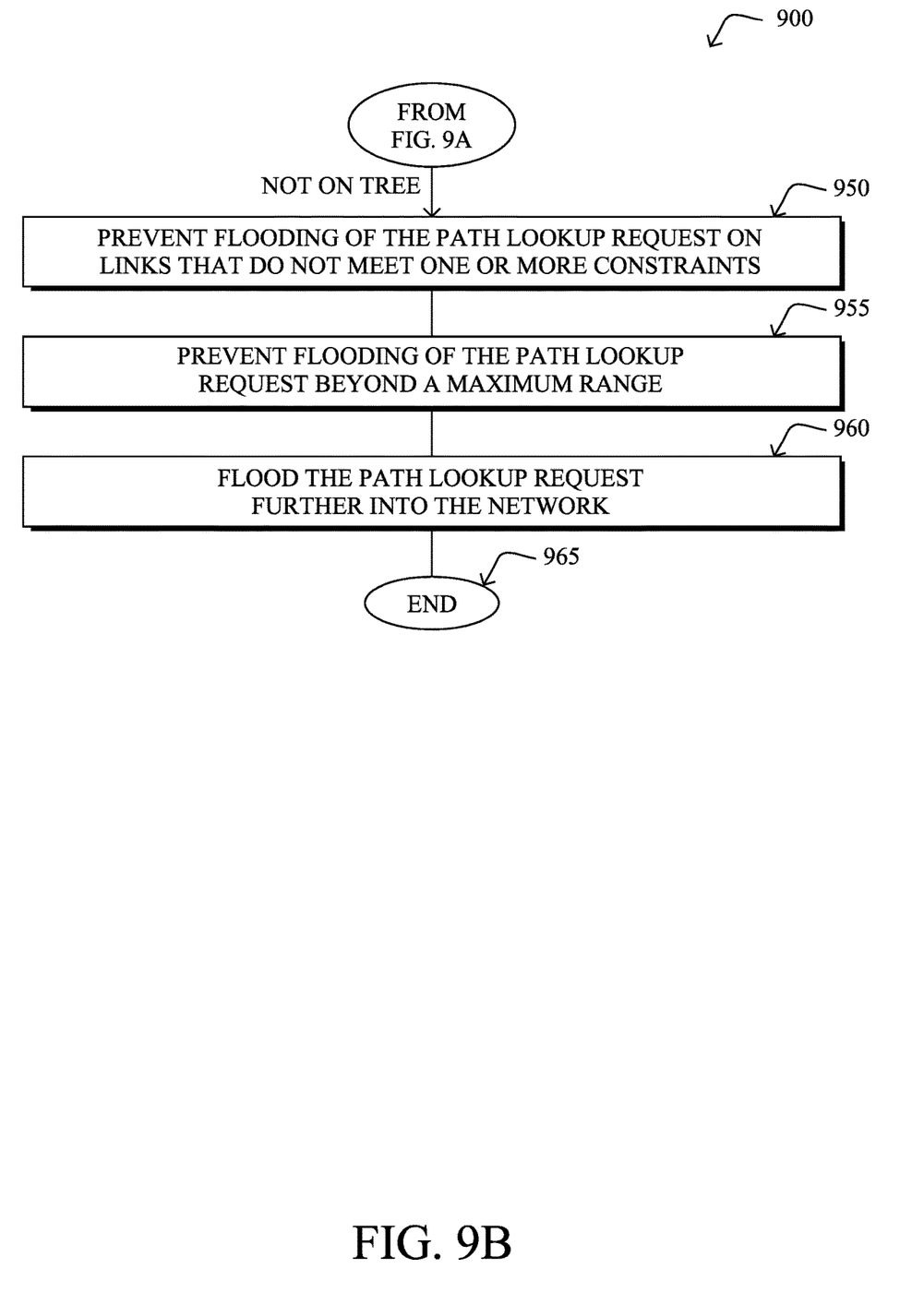

In addition, FIGS. 9A-9B illustrate another example simplified procedure for distributed constrained tree formation for deterministic multicast in a network in accordance with one or more embodiments described herein, particularly from the perspective of a device receiving a path lookup request (e.g., nodes A, B, and C, and any intermediate nodes, from FIG. 5 above). For example, a non-generic, specifically configured device (e.g., device 200) may perform procedure 900 by executing stored instructions (e.g., process 248). The procedure 900 may start at step 905 in FIG. 9A, and continues to step 910, where, as described in greater detail above, node in a network receives a path lookup request 510 flooded into the network from a multicast listener device to search for nodes on a multicast tree 420. In step 915, the node may then determine whether it is on the multicast tree 420. If not, the procedure 900 continues to step 950 in FIG. 9B below. However, if the node is a candidate node on the desired multicast tree 420, then the procedure continues to step 920.

In particular, in response to determining that the node is on the multicast tree (e.g., nodes A, B, and C), then in step 920 the node determines a total path latency from a source S of the multicast tree 420 to the multicast listener device (D2) via the node (e.g., A, B, or C, respectively). If the node determines in step 925 that the total path latency is greater than the maximum allowable path latency, then in step 930 the node suppresses any path lookup response, and may simply drop the flooded request.

If, however, in step 925 the node can determine that the total path latency is less than or equal to a maximum allowable path latency, then in step 935 the candidate node can determine a unicast routing cost from the candidate node to the multicast listener device (e.g., from the received request 510), and returns, in step 940, a path lookup response 710 as a candidate node on the multicast tree 420. Note that as described above, the path lookup response 710 indicates the unicast routing cost, causing the multicast listener device to select a particular node of one or more candidate nodes as a join point for the multicast tree based on the associated unicast routing cost to the multicast listener device from among the one or more candidate nodes, as described above in procedure 800 of FIG. 8. The procedure 900 may then end in step 945 for a candidate node (e.g., A or B) as well as for a non-compliant candidate node (e.g., node C) on the tree 420 but outside of one or more constraints (e.g., total latency).

In the event that the receiving node in procedure 900 (particularly step 915) is not on the desired multicast tree 420, then as shown in FIG. 9B, in step 950, in response to determining that the node is not on the multicast tree, the node may determine whether to prevent flooding of the path lookup request 510 on any links that do not meet one or more constraints associated with the path lookup request as mentioned above (e.g., links with less than a minimum available link bandwidth). In addition, when the path lookup request is associated with a maximum range 520, then in step 955 the receiving node may further prevent flooding of the path lookup request beyond the maximum range. Assuming no prevention of flooding exists, the procedure 900 continues to step 960 to flood the path lookup request 510 further into the network, accordingly. Note that as described above, step 960 may include aggregating within the path lookup request the return path latency and unicast routing cost to be carried along each flooding path while searching for nodes on the multicast tree. The procedure 900 for intermediate nodes may then end in step 965.

It should be noted that while certain steps within procedures 800-900 may be optional as described above, the steps shown in FIGS. 8-9B are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-900 are described separately, certain steps from each procedure may be incorporated into each other procedure, and the procedures are not meant to be mutually exclusive.

The techniques described herein, therefore, provide for distributed constrained tree formation for deterministic multicast. In particular, the techniques herein enable multicast distribution for deterministic flows (e.g., AVB flows) within constraints such as latency. Compared to a traditional PIM approach, the techniques herein lower the amount of network resources (e.g., buffers at the end point and bandwidth along the way) that is consumed by the multicast flow.

While there have been shown and described illustrative embodiments that provide for distributed constrained tree formation for deterministic multicast, it is to be understood that various other adaptations and modifications may be made within the spirit and scope of the embodiments herein. For example, while certain embodiments are described herein with respect to AVB networks and multicast trees, the techniques are not limited as such and may be used for other types of distribution trees, in other embodiments. In addition, while certain protocols are shown, such as particular AVB and/or PIM protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    flooding, from a multicast listener device in a network, a path lookup request into the network to search for nodes on a multicast tree;
    receiving, at the multicast listener device, one or more path lookup responses from one or more candidate nodes on the multicast tree, wherein each of the one or more path lookup responses indicates a unicast routing cost from a respective candidate node to the multicast listener device, and wherein only nodes where the total path latency is less than the maximum allowable path latency respond to the path lookup request as the one or more candidate nodes;
    selecting, by the multicast listener device, a particular node of the one or more candidate nodes that responded to the path look up request, wherein the particular node is a join point for the multicast tree and is selected based on the particular node having a lowest associated unicast routing cost to the multicast listener device from among the one or more candidate nodes; and
    joining, by the multicast listener device, the multicast tree at the selected join point to build a multicast tree, wherein the join point is the particular node where the total path latency is less than the maximum allowable path latency while also having the lowest associated unicast routing cost of the one or more candidate nodes.

2. The method as in claim 1, wherein the path lookup request is configured to aggregate and carry return path latency and unicast routing cost along each flooding path while searching for nodes on the multicast tree.

3. The method as in claim 1, wherein the path lookup request is associated with one or more constraints, and wherein nodes within the network are configured to prevent flooding of the path lookup request on links that do not meet the one or more constraints.

4. The method as in claim 3, wherein one of the one or more constraints is a minimum available link bandwidth.

5. The method as in claim 1, wherein the path lookup request is associated with a maximum range, and wherein nodes within the network are configured to prevent flooding of the path lookup request beyond the maximum range.

6. The method as in claim 5, wherein the maximum range is selected from a group consisting of: the maximum allowable latency; a bounded latency before reaching the multicast tree; a maximum unicast routing cost before reaching the multicast tree; and a maximum hop count before reaching the multicast tree.

7. The method as in claim 5, further comprising:
    retrying the path lookup request with a larger maximum range in the event of a failure to reach the multicast tree.

8. A method, comprising:
    receiving, at a node in a network, a path lookup request flooded into the network from a multicast listener device to search for nodes on a multicast tree, wherein the path look up request includes one or more constraints;
    determining, by the node, if the node is on the multicast tree;
    in response to determining, by the node, that the node is on the multicast tree:
        determining, by the node, a total path latency from a source of the multicast tree to the multicast listener device via the node;
        in response to determining that the total path latency is less than or equal to a maximum allowable path latency:
            determining, by the node, a unicast routing cost from the candidate node to the multicast listener device; and
            returning, by the node, a path lookup response to the multicast listener node only when the total path latency is less than or equal to a maximum allowable path latency, the path lookup response indicating to the multicast listener that the node is a candidate node for a join point on the multicast tree, wherein the path lookup response indicates the unicast routing cost,
        wherein the path lookup response causes the multicast listener device to select a particular node of one or more candidate nodes as a join point for the multicast tree based on the associated unicast routing cost to the multicast listener device from among the one or more candidate nodes;

joining, by the node, the multicast listener to the multicast listener tree when the node has the lowest unicast routing cost from among those nodes that responded as having total path latencies of less than or equal to a maximum allowable path latency.

9. The method as in claim 8, further comprising:
in response to determining, by the node, that the node is not on the multicast tree, flooding the path lookup request further into the network.

10. The method as in claim 9, the method further comprising:
preventing flooding of the path lookup request on links that do not meet the one or more constraints.

11. The method as in claim 10, wherein one of the one or more constraints is a minimum available link bandwidth.

12. The method as in claim 9, wherein the path lookup request is associated with a maximum range, the method further comprising:
preventing flooding of the path lookup request beyond the maximum range.

13. The method as in claim 12, wherein the maximum range is selected from a group consisting of: the maximum allowable latency; a bounded latency before reaching the multicast tree; a maximum unicast routing cost before reaching the multicast tree; and a maximum hop count before reaching the multicast tree.

14. The method as in claim 8, wherein the path lookup request is configured to aggregate and carry return path latency and unicast routing cost along each flooding path while searching for nodes on the multicast tree.

15. An apparatus, comprising:
one or more network interfaces to communicate within a network as a multicast listener device;
a processor coupled to the network interfaces and adapted to execute one or more processes; and
a memory configured to store a process executable by the processor, the process when executed operable to:
flood a path lookup request into the network to search for nodes on a multicast tree;
receive one or more path lookup responses from one or more candidate nodes on the multicast tree, wherein each of the one or more path lookup responses indicates a unicast routing cost from a respective candidate node to the multicast listener device, and wherein only nodes where the total path latency is less than the maximum allowable path latency respond to the path lookup request as the one or more candidate nodes;
select a particular node of the one or more candidate nodes that responded to the path look up request, wherein the particular node is a join point for the multicast tree and is selected based on the particular node having a lowest associated unicast routing cost to the multicast listener device from among the one or more candidate nodes; and
join the multicast tree at the selected join point to build a multicast tree, wherein the join point is the particular node where the total path latency is less than the maximum allowable path latency while also having the lowest associated unicast routing cost of the one or more candidate nodes.

16. The apparatus as in claim 15, wherein the path lookup request is configured to aggregate and carry return path latency and unicast routing cost along each flooding path while searching for nodes on the multicast tree.

17. The apparatus as in claim 15, wherein the path lookup request is associated with one or more constraints, and wherein nodes within the network are configured to prevent flooding of the path lookup request on links that do not meet the one or more constraints.

18. The apparatus as in claim 15, wherein the path lookup request is associated with a maximum range, and wherein nodes within the network are configured to prevent flooding of the path lookup request beyond the maximum range.

19. An apparatus, comprising:
one or more network interfaces to communicate within a network;
a processor coupled to the network interfaces and adapted to execute one or more processes; and
a memory configured to store a process executable by the processor, the process when executed operable to:
receive a path lookup request flooded into the network from a multicast listener device to search for nodes on a multicast tree, wherein the path look up request includes one or more constraints;
determine if the apparatus is a node on the multicast tree; and
in response to determining that the node is on the multicast tree:
determine a total path latency from a source of the multicast tree to the multicast listener device via the node;
determine a unicast routing cost from the candidate node to the multicast listener device in response to the total path latency being less than or equal to a maximum allowable path latency;
return a path lookup response to the multicast listener node only when the total path latency is less than or equal to a maximum allowable path latency, the path lookup response indicating to the multicast listener that the node is a candidate node for a join point on the multicast tree, wherein the path lookup response includes the unicast routing cost,
wherein the path lookup response causes the multicast listener device to select a particular node of one or more candidate nodes as a join point for the multicast tree based on the associated unicast routing cost to the multicast listener device from among the one or more candidate nodes; and
join the multicast listener to the multicast listener tree when the node has the lowest unicast routing cost from among those nodes that responded as having total path latencies of less than or equal to a maximum allowable path latency.

20. The apparatus as in claim 19, wherein the process when executed is further operable to:
flood the path lookup request further into the network in response to determining that the node is not on the multicast tree.

* * * * *

UNITED STATES PATENT AND TRADEMARK OFFICE
CERTIFICATE OF CORRECTION

PATENT NO. : 10,652,135 B2
APPLICATION NO. : 15/216007
DATED : May 12, 2020
INVENTOR(S) : Pascal Thubert et al.

Page 1 of 1

It is certified that error appears in the above-identified patent and that said Letters Patent is hereby corrected as shown below:

In the Claims

Column 10, Line 62, please amend as shown:
tree, wherein the path lookup response includes Signed and Sealed this
Eighth Day of September, 2020

Andrei Iancu
*Director of the United States Patent and Trademark Office*